(12) United States Patent
Hanwell et al.

(10) Patent No.: US 11,228,723 B2
(45) Date of Patent: Jan. 18, 2022

(54) PIXEL CORRECTION

(71) Applicant: Apical Limited, Cambridge (GB)

(72) Inventors: David Hanwell, Cambridge (GB); Nerhun Yildiz, Cambridge (GB)

(73) Assignee: Apical Limited, Cambridge (GB)

( * ) Notice: Subject to any disclaimer, the term of this patent is extended or adjusted under 35 U.S.C. 154(b) by 0 days.

(21) Appl. No.: 16/791,001

(22) Filed: Feb. 14, 2020

(65) Prior Publication Data
US 2020/0288074 A1   Sep. 10, 2020

(30) Foreign Application Priority Data
Mar. 5, 2019 (GB) ..................... 1902953

(51) Int. Cl.
| H04N 5/367 | (2011.01) |
| H04N 9/04 | (2006.01) |
| H04N 5/217 | (2011.01) |
| H04N 5/365 | (2011.01) |
| G09G 3/20 | (2006.01) |
| G09G 3/00 | (2006.01) |

(52) U.S. Cl.
CPC .................... H04N 5/367 (2013.01)

(58) Field of Classification Search
CPC ....... H04N 5/367; H04N 5/217; H04N 5/3675
See application file for complete search history.

(56) References Cited

U.S. PATENT DOCUMENTS

| 2003/0179418 A1 | 9/2003 | Wengender et al. |
| 2005/0231617 A1 | 10/2005 | Kitani |
| 2007/0030365 A1* | 2/2007 | Jerdev ............... H04N 5/367 348/241 |
| 2008/0049125 A1 | 2/2008 | Subbotin |
| 2016/0006960 A1* | 1/2016 | Takahashi ............ H04N 5/367 348/246 |
| 2018/0160064 A1* | 6/2018 | Mahara ................ H04N 5/367 |
| 2019/0166320 A1* | 5/2019 | Maruyama ............ H04N 5/367 |

FOREIGN PATENT DOCUMENTS

WO    2017105846 A1    6/2017

OTHER PUBLICATIONS

United Kingdom Search Report dated Sep. 4, 2019 for GB Application No. 1902953.7.

\* cited by examiner

*Primary Examiner* — Christopher K Peterson
(74) *Attorney, Agent, or Firm* — EIP US LLP

(57) ABSTRACT

A method and apparatus for image processing, the method comprising obtaining input image data comprising a plurality of pixel intensity values representing a respective plurality of pixel locations, obtaining pixel location data identifying one or more pixel locations represented by compromised pixel intensity values, generating interpolated image data comprising improved pixel intensity values, storing improved image data comprising at least the interpolated image data, and detecting one or more further compromised pixel intensity values based on the improved image data.

19 Claims, 8 Drawing Sheets

PIXEL CORRECTION

CROSS-REFERENCE TO RELATED APPLICATIONS

This application claims the benefit under 35 U.S.C. § 119(a) and 37 CFR § 1.55 to United Kingdom patent application no. GB 1902953.7 filed on Mar. 5, 2019, the entire content of which is incorporated herein by reference.

BACKGROUND OF THE INVENTION

Field of the Invention

The present disclosure relates to methods and apparatus for processing image data.

Description of the Related Technology

Image sensors for capturing images may be present in devices such as digital cameras, mobile phone cameras, and other image capturing devices. Image sensors used to capture images may comprise millions of individual sensor elements for determining an intensity of light arriving on the sensor at each sensor element. Each sensor element represents a pixel. The light intensity information gathered by these sensors may be used to recreate an image captured by the sensor. Image sensors may comprise a colour filter array over the image sensor elements, for example a Bayer filter array, to provide colour information such that an image may be reproduced in colour. Colour filter arrays, such as Bayer filter arrays, filter the light measurable by the sensor elements such that each sensor element may determine the intensity of light from a given colour channel, for example red, green, or blue. To produce a final image, data output from an image sensor may be processed. Data output from an image sensor may be processed to smooth or sharpen edges and/or to correct or generate colour values. Processing data output from an image sensor may comprise interpolating image data to generate or modify pixel intensity values.

During image capture some sensor elements may malfunction and consequently produce an output which is incorrect. The way in which the output is incorrect may depend on the type of malfunction. Some malfunctions may occur repeatedly for images captured by an image capture device due to faulty sensor pixels, whereas others may be transient and may only occur for some images and may be dependent on environmental factors. If the output of an image sensor element gives a maximum value, where a maximum value is not appropriate, it is said to be a hot pixel. If the output of an image sensor gives a zero value, where a zero value is not appropriate, it is said to be a dead pixel. If the output of an image sensor element gives the same value repeatedly it is said to be a stuck pixel.

If a neighboring sensor element has malfunctioned then the interpolated value, generated from the malfunctioned sensor elements output, may be incorrect. Consequently, some image processing systems detect incorrect pixel intensity values in image data and attempt to correct them. Detecting of incorrect pixel intensity values may involve analysing pixel intensity values output from neighboring image sensor elements. Where malfunctioned, or defective, sensor elements are located in close proximity to each other the accuracy of detection of incorrect pixel intensity values may be compromised.

It is desired to provide a method and system for use in detecting and/or correcting defective pixel intensity values of image data.

SUMMARY

According to a first aspect of the present invention, there is provided a method comprising:
obtaining input image data representative of at least a portion of an image, the input image data comprising a plurality of pixel intensity values representing a respective plurality of pixel locations;
obtaining pixel location data identifying one or more pixel locations represented by one or more respective compromised pixel intensity values;
generating interpolated image data comprising one or more improved pixel intensity values representing the one or more identified pixel locations based on the input image data and the pixel location data;
storing improved image data comprising at least the interpolated image data; and
detecting one or more further compromised pixel intensity values based on the improved image data.

By storing improved image data comprising interpolated image data and detecting one or more further compromised pixel intensity values based on the improved image data, the accuracy of detecting further compromised pixel intensity values may be increased. Improving the quality of the image data before using it to detect further compromised pixel intensity values may increase the number of compromised pixel intensity values which may be detected without increasing the number of false detections. This may make the detection of compromised pixel intensity values which are nearby to other compromised pixel intensity values more reliable.

According to a second aspect of the present invention there is provided an apparatus comprising:
at least one processor;
at least one memory including computer program code, the at least one memory and the computer program code configured to, with the at least one processor, cause the apparatus at least to:
obtain input image data representative of at least a portion of an image, the input image data comprising a plurality of pixel intensity values representing a respective plurality of pixel locations;
obtain pixel location data identifying one or more pixel locations represented by one or more respective compromised pixel intensity values;
generate interpolated image data comprising one or more improved pixel intensity values representing the one or more identified pixel locations based on the input image data and the pixel location data;
store improved image data comprising at least the interpolated image data; and
detect one or more further compromised pixel intensity values based on the improved image data.

According to a third aspect of the present invention there is provided a non-transitory computer-readable storage medium comprising computer-executable instructions which when executed by a processor cause operation of an image processing system at least to:
obtain input image data representative of at least a portion of an image, the input image data comprising a plurality of pixel intensity values representing a respective plurality of pixel locations;

obtain pixel location data identifying one or more pixel locations represented by one or more respective compromised pixel intensity values;

generate interpolated image data comprising one or more improved pixel intensity values representing the one or more identified pixel locations based on the input image data and the pixel location data;

store improved image data comprising at least the interpolated image data; and detect one or more further compromised pixel intensity values based on the improved image data.

Further features and advantages of the invention will become apparent from the following description of preferred embodiments of the invention, given by way of example only, which is made with reference to the accompanying drawings.

BRIEF DESCRIPTION OF THE DRAWINGS

FIG. 3A shows a schematic diagram of a sub-arrangement of pixel locations;

FIG. 3B shows a schematic diagram of a sub-arrangement of pixel locations;

FIG. 3C shows a schematic diagram of a sub-arrangement of pixel locations;

DETAILED DESCRIPTION OF CERTAIN INVENTIVE EMBODIMENTS

Details of examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily other examples. It should further be noted that certain examples are described schematically with certain features omitted and/or necessarily simplified for ease of explanation and understanding of the concepts underlying examples.

Figure 1:
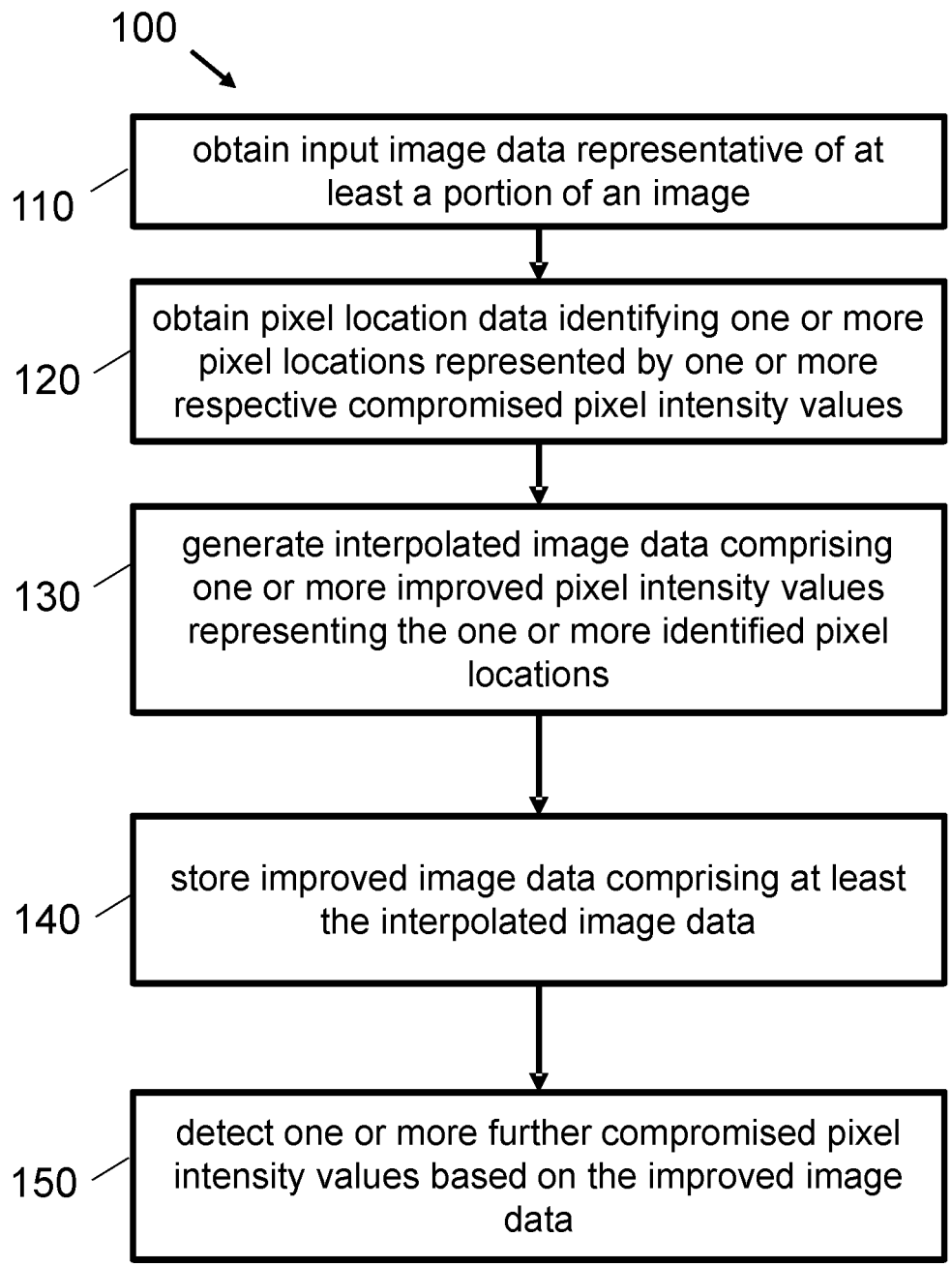
FIG. 1 shows a flow chart of a method according to an example.

FIG. 1 shows a flow chart 100 of a method of processing image data according to an example. The method comprises, at block 110, obtaining input image data representative of at least a portion of an image, the input image data comprising a plurality of pixel intensity values representing a respective plurality of pixel locations. The input image data may be obtained from a local imaging sensor. For example, an image capture device, such as a smart telephone or a camera, may capture image data using an image sensor and the method may be performed in the smart telephone or camera. In some examples, the input image data may be captured by a remote image sensor and may be transmitted to be received. For example, a remote imaging device such as a smart telephone or a camera may capture image data using an image sensor and may transmit the image data over a wide area network, for example the internet, or a local area network via a network interface.

Image sensors used to capture images may comprise an array of sensor elements, which may also be called sensor pixels. The sensor pixels may comprise a photosensitive element, for example a photodiode that can convert incident light into electronic signals or data. The sensor pixels may comprise any photosensor suitable for capturing images. Further examples of sensor pixel photosensitive elements may include, charged-coupled devices (CCDs), or complementary metal-oxide semiconductors (CMOSs). When capturing images, the image sensor may be exposed to incident light for a predetermined period of time. During this exposure, incident photons are converted into electrons by the photosensor and the charge may be stored by a capacitor. Each sensor pixel may comprise a capacitor to store the charge generated by the respective photosensor. Each sensor pixel may further comprise circuitry configured to measure the charge stored by the capacitor and to convert the amount of charge stored to a digital value. This digital value may be called a pixel intensity value. The input image data may represent, for example, at least one characteristic of the light captured by an image sensor. The input image data may be representative of an intensity of the light captured by each sensor pixel, the intensity of light may be proportional to the number of photons captured by that sensor pixel. The intensity may represent a luminance of captured light, which is for example a measure of the intensity of light per unit area rather than absolute intensity. In other examples, the input image data may be representative of a brightness of captured light, which may be considered to correspond to a perception of luminance, which may or may not be proportional to luminance. The input image data may be representative of any photometric quantity or characteristic that may be used to represent the visual appearance of the image represented by the data. The input image data may be in any suitable format, for example raw image format.

In some examples, each pixel location of the image is associated with a colour channel. For example, an image sensor used to capture an image may comprise a colour filter array. A colour filter array may comprise an array of colour filter elements arranged in a predetermined pattern. Each colour filter element may correspond to a respective sensor pixel of the image sensor. The predetermined pattern may be considered to form a mosaic or a repeating pattern. A colour filter element may allow light of a particular colour to pass through and be received by a corresponding sensor pixel. A colour filter may also prevent light of certain colours from being passed through to the corresponding sensor pixel. A colour may refer to any range of wavelengths of light, for example, a clear, or white filter element which passes substantially all the received light through may still be considered a colour filter element. In other examples, colours may have narrower wavelength ranges and may include, for example, green, blue, and red. In this way, the colour filter array may allow different sensor pixels of an array of sensor pixels to receive different colours of incident light. Thereby, pixel locations of the image may each be associated with a single colour. A specific example of a colour filter pattern may be a Bayer filter pattern.

At block 120 the method shown in FIG. 1 comprises obtaining pixel location data identifying one or more pixel locations represented by one or more respective compromised pixel intensity values. In an example, a compromised pixel intensity value may be a pixel intensity value which is incorrect, for example, a pixel intensity value which does not accurately represent the amount of light incident on the sensor pixel or on the respective lens of the sensor pixel. In some examples, the pixel location data may identify one or more static defect pixel locations. Static defect pixel locations may be specific to a particular image sensor, for example, where sensor pixels develop static defects during a manufacturing process. In some examples, the locations of static defect sensor pixels may be determined by a manufacturer and stored in memory at the image sensor, for example, stored in one time programmable (OTP) memory on the sensor itself. In some examples, the pixel location data identifies one or more phase detection autofocus pixel locations. The arrangement of PDAF pixel locations may be dependent on the method of PDAF which is employed, for example split sensor pixel, 2×1 OCL (two sensor pixels sharing a single micro lens), or shielded sensor pixels where the photosensor is partially covered. Examples of PDAF sensor pixel arrangements will be discussed further in relation to FIG. 2. PDAF sensor pixel arrangements generally occur in repeating patterns and their locations may be determined when manufacturing an image sensor.

In some examples a compromised pixel intensity value may be a pixel intensity value which is generated by a sensor pixel which is a static defect sensor pixel. However, the compromised pixel intensity value may not necessarily be an incorrect pixel intensity value. For example, where the static defect sensor pixel is a stuck sensor pixel, the output value may in fact be correct. However, the sensor pixel from which it is generated may be a static defect sensor pixel. The above also applies to PDAF sensor pixels, in some examples the output value from a PDAF sensor may be correct, or may appear so, but the pixel intensity value may nonetheless be a compromised pixel intensity value.

Pixel location data may comprise data which identifies individual pixel locations corresponding to sensor pixel locations. The pixel location data may be in any suitable format for identifying the position of individual pixel locations. The pixel location data may be a compromised location mask, wherein the compromised location mask may be used to identify pixel locations where the respective pixel intensity values are compromised pixel intensity values, for example, pixel intensity values generated from static defect sensor pixels or generated from phase detection autofocus sensor pixels. Obtaining the pixel location data may comprise receiving the pixel location data. For example, the pixel location data may be transmitted along with the input image data by a remote imaging device. Alternatively, the pixel location data may be generated locally. In some examples, the pixel location data identifies one or more static defect pixel locations and one or more phase detection autofocus pixel locations.

In some examples, obtaining pixel location data comprises generating the pixel location data based on predetermined phase detection autofocus pixel locations and predetermined static defect pixel locations. For example, data corresponding to the locations of static defect sensor pixels may be stored in memory at the image sensor or in memory in an image capture device, data corresponding to the locations of PDAF sensor pixels may be stored in memory in an image capture device, or in memory at an image sensor. The size of the memory available at an image sensor may be smaller than the available memory in an image capture device and therefore it may be preferable to store the data corresponding to the locations of PDAF sensor pixels at the image capture device. In some examples, data corresponding to the locations of PDAF sensor pixels comprises data indicative of the pattern or arrangement of PDAF sensor pixels, in this example it may be possible to store the data corresponding to the PDAF sensor pixels in the memory at the image sensor wherein the actual locations and/or coordinates of PDAF sensor pixels are determined elsewhere based on this data. In other examples, the data corresponding to the location of the PDAF sensor pixels comprises the data indicative of the locations of all the PDAF sensor pixels. Generating pixel location data may comprise combining data corresponding to the location of static defect sensor pixels and data corresponding to the location of PDAF sensor pixels. Obtaining pixel location data may also comprise converting data corresponding to the location of static defect pixel locations and phase detection autofocus pixel locations.

In some examples, image sensors may comprise millions of sensor pixels. Some sensor pixels may malfunction during an image capture process and as such, may output a pixel intensity value which is incorrect, for example the pixel intensity value output from a malfunctioned sensor pixel may not accurately represent the amount of light received by the photosensor. Conventionally, following the capture of an image, pixel intensity values which are incorrect may be detected based on pixel intensity values of nearby sensor pixels. For example, where a region of an image is dark, a single pixel which gives a maximal value is likely to be incorrect and may be easily detected. Some malfunctions may occur only occasionally or in specific conditions, these may be called dynamic defects. They may manifest as incorrect pixel intensity values for certain pixel locations in an image. These faults may not re-occur when capturing subsequent images. For example, environmental factors such as temperature and humidity may affect some sensor pixels. Consequently, these sensor pixels may produce incorrect pixel intensity values when under specific environmental conditions. To ascertain the presence of dynamic defects, real time analysis of all of the pixel data read from the sensor may be performed.

However, other malfunctions may be permanent, for example, during a manufacturing process of an image sensor, some sensor pixels may become damaged or may not be connected correctly to the underlying circuitry, or the circuity itself may develop a fault. Malfunctions which are present in may be called static defects. Pixel locations where these re-occurring defects manifest may be called static defect pixel locations. Depending on the resultant pixel intensity value output from a sensor pixel following an image capture process, the type of malfunction may be categorised as follows. A sensor pixel which always produces a maximal output value may be called a hot pixel, or a hot sensor pixel. A sensor pixel which always produces a zero output value may be called a dead pixel, or a dead sensor pixel. A sensor pixel which produces the same output value repeatedly may be called a stuck pixel, or a stuck sensor pixel. Other sensor pixel defects may also occur where the output value is incorrect. These pixel defects may be transient and may only occur for during a single image capture process. Due to the nature of defect detection and correction, dynamic defects which are positioned nearby to static defects may be more difficult to detect and/or correct as the detection may depend on surrounding pixel intensity values including pixel intensity values from static defect sensor pixels.

In some examples, incorrect values may also be generated at particular pixel locations due to the use of a sensor pixel for phase detection autofocus (PDAF). Phase detection autofocus is a process of correcting the focus of an image during image capture by, generally, dividing the light into pairs of images and comparing them. In some examples, a small percentage of the sensor pixels may be used as PDAF sensor pixels. There are a number of possible arrangements and constructions of PDAF sensor pixels which may be used to correct the focus when capturing an image. In an example, a pair of sensor pixels which are near each other on the image sensor, are each partially masked such that one sensor pixel receives light incident on the left part of its respective lens while the other sensor pixel receives light incident on the right part of its respective lens. Due to the proximity of the two sensor pixels, the difference in the amount of light measured by each sensor pixel may be indicative of whether the image is in focus at that part of the image sensor. Due to the modification of the sensor pixels as described above the pixel intensity value output from the sensor pixel may not accurately represent the amount of light which was incident on the lens at that pixel location. In other arrangements, a single lens may be used across a pair of sensor pixels or a sensor pixel may be split into two individual sensor pixels. The pairs of sensor pixels used for PDAF may be distributed evenly around the image sensor. The number of sensor pixels used for PDAF may be dependent on the type of image sensor and the device in which the image sensor is deployed. In an example, the proportion of sensor pixels which are used for PDAF is below 5%. For example, in a 32×32 array of sensor pixels 16 sensor pixels may be used for PDAF. In some image sensors the proportion of sensor pixels which are used for PDAF is larger than the example given above. The method comprises, at block 130, generating interpolated image data comprising one or more improved pixel intensity values representing the one or more identified pixel locations based on the input image data and the pixel location data. At block 140, the method comprises, storing improved image data comprising at least the interpolated image data, and at block 150 the method comprises detecting one or more further compromised pixel intensity values based on the improved image data. As discussed above, compromised pixel intensity values, for example pixel intensity values which represent dynamic defect pixel locations, may be detected and corrected based on pixel intensity values representing nearby pixel locations. In other examples further compromised pixel intensity values may comprise pixel intensity values which represent static defect pixel locations which are not identified by the pixel location data, for example compromised pixel intensity values generated by malfunctions of sensor pixels which were not detected when generating static defect pixel location data, for example by a manufacturer. By storing improved image data, comprising interpolated pixel intensity values, before detecting further compromised pixel intensity values, for example pixel intensity values representing dynamic defect pixel locations, it may be possible to increase the accuracy of compromised pixel intensity value detection. It may also be possible to increase the accuracy of generating corrected pixel intensity values corresponding to compromised pixel intensity values. The method shown in blocks 130 to 150 will be described further in relation to other Figures.

Figure 2:
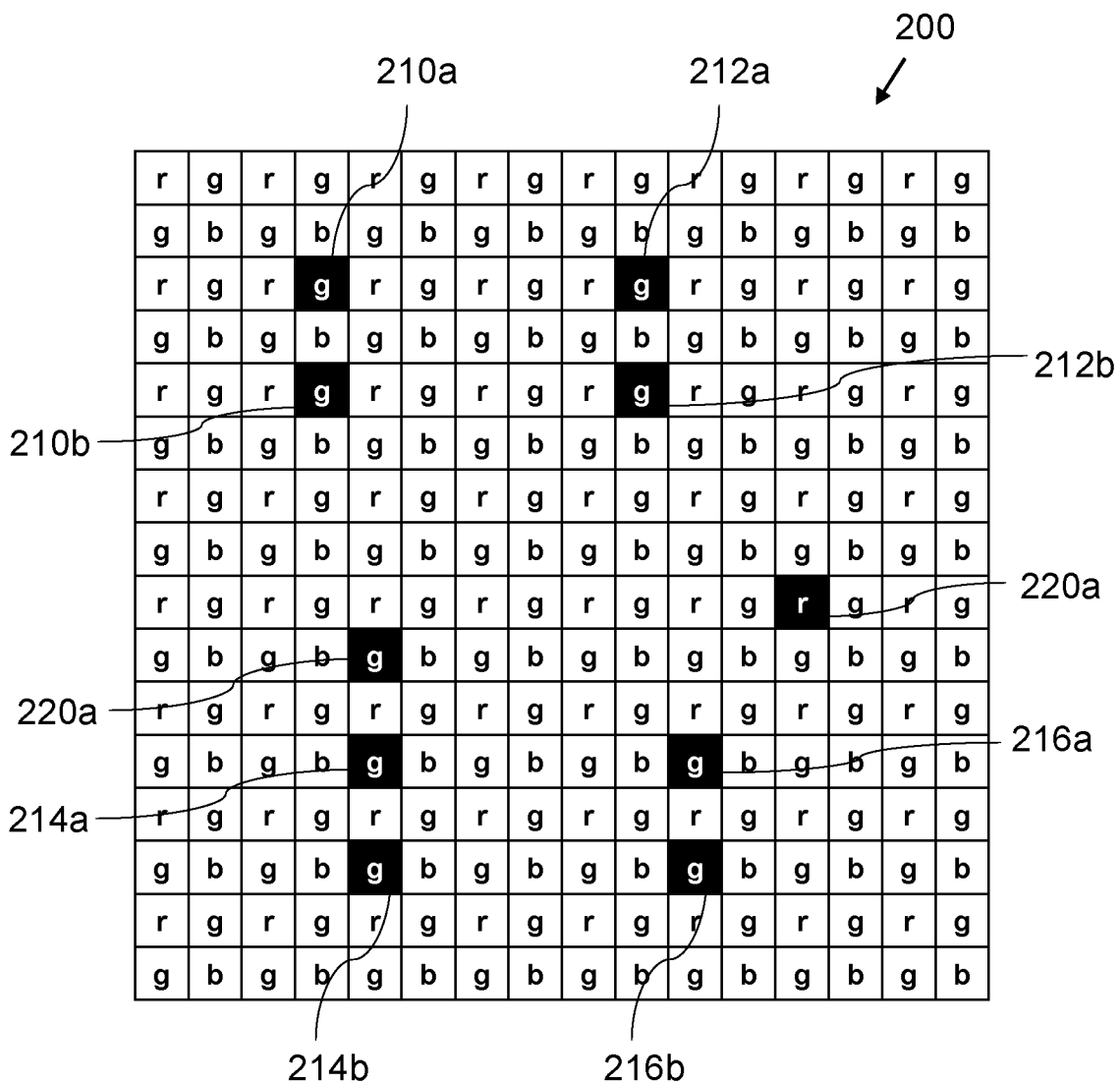
FIG. 2 shows a schematic diagram of an arrangement of pixel locations representing at least a portion of an image according.

FIG. 2 shows a schematic diagram of an example arrangement of pixel locations 200 of input image data representative of at least a portion of an image. The arrangement of pixel locations 200 comprises a plurality of pixel locations each represented by a respective pixel intensity value. Each pixel location corresponds to a colour channel and the pixel locations are arranged in a Bayer colour filter pattern. Throughout this disclosure, examples will be described with respect to input image data wherein the input image data is generated according to a Bayer colour filter array. However, it will be appreciated that this is given as one specific example. In other examples, a different colour filter pattern may be used, and in still further examples no colour filter may be used over the image sensor or the corresponding sensor pixels. The pixel locations shown in FIG. 2 comprise pixel locations 210*a*, 210*b*, 212*a*, 212*b*, 214*a*, 214*b*, 216*a*, and 216*b* corresponding to PDAF pixel locations. As discussed above the PDAF pixel locations may be arranged in pairs. In the example shown in FIG. 2, each pair of pixel locations which correspond to PDAF pixel locations are arranged vertically with a further pixel location between them. In other examples, the pairs of PDAF pixel locations may be arranged horizontally. In some examples, the pairs of PDAF pixel locations may be directly adjacent. As discussed above, in some examples, each PDAF pixel location may be split into two pixel locations used for PDAF. In each pair of PDAF pixel locations, the pixel locations correspond to the same colour channel, this is due to the comparison of intensity of light which is used in PDAF. In the example shown in FIG. 2 there are eight PDAF pixel locations within a 16×16 set of pixel locations. However, in other examples the number of PDAF pixel locations within a 16×16 set of pixel locations may be more numerous than in this example. In other examples there may be fewer PDAF pixel locations within a 16×16 set of pixel locations than that shown in FIG. 2. The example arrangement of pixel locations 200 also comprises pixel locations corresponding to static defect pixel locations 220*a*, 220*b*.

Generating Interpolated Image Data

Figures 3A, 3B, 3C:
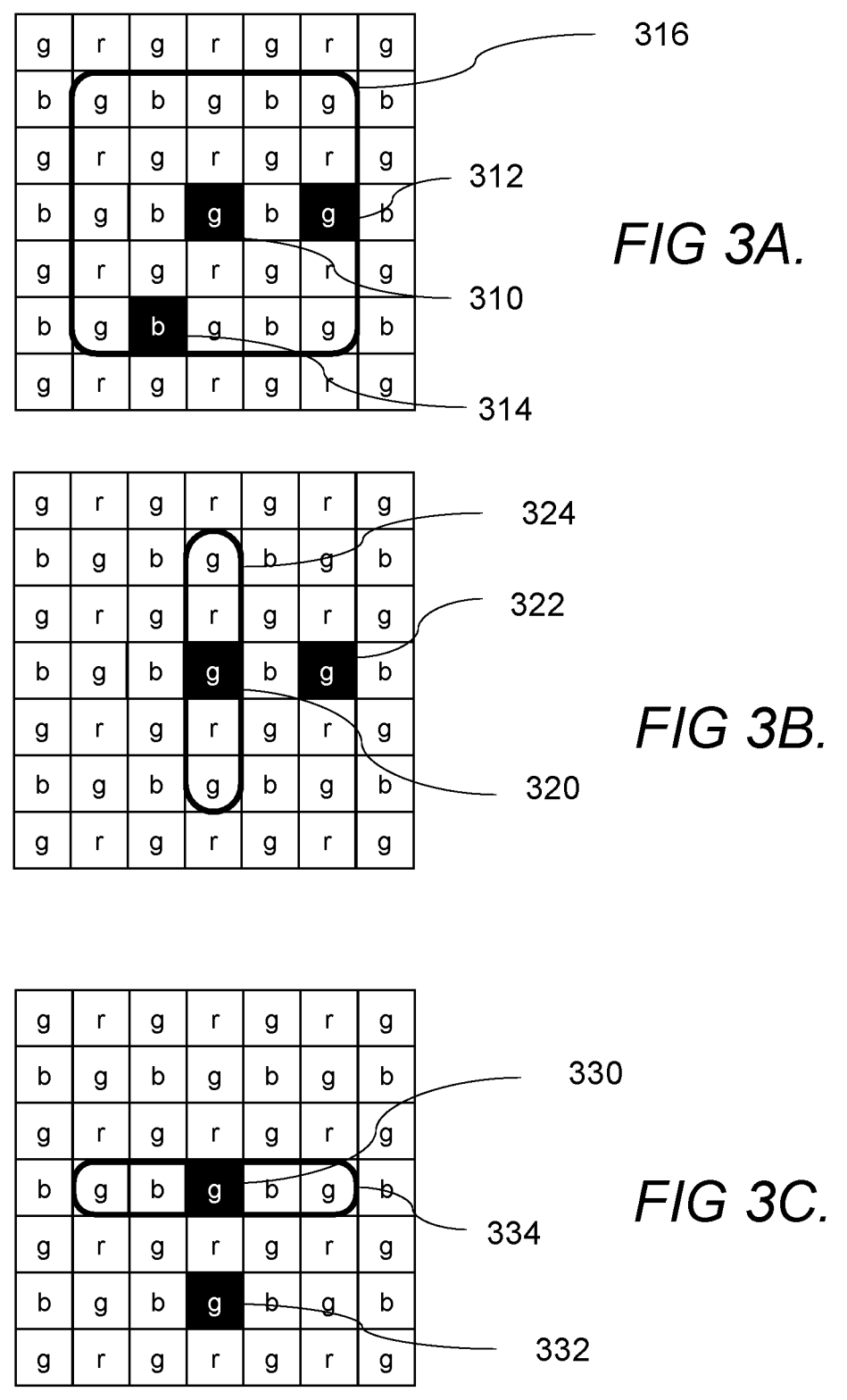

In some examples, generating interpolated image data comprises generating one or more improved pixel intensity values at least by interpolation of pixel intensity values representing selected neighboring pixel locations. For example, this may include taking a weighted average of pixel intensity values representing neighboring pixel intensity values. In some examples, this may comprise blending the weighted average of pixel intensity values representing neighboring pixel intensity values with the compromised pixel intensity value identified by the pixel location data. The ratio of blending may be dependent on the type of compromised pixel intensity value, for example whether it is generated by a static defect sensor pixel or a PDAF sensor pixel. In some examples, the selected neighboring pixel locations are pixel locations having the same colour channel as the pixel location for which the improved pixel intensity value is being generated. In other examples, the selected neighboring pixel locations may include pixel locations corresponding to a different colour channel, in these cases the weightings applied to pixel intensity values representing the pixel locations corresponding to a different colour channel may be different to those applied to pixel intensity values from pixel locations corresponding to the same colour channel. In some examples, the selected neighboring pixel locations may not include pixel locations identified by the pixel location data. FIG. 3A shows a schematic diagram of a sub-arrangement of pixel locations comprising a PDAF pixel location 310 for which an improved pixel intensity value is to be generated. The sub-arrangement also comprises a further PDAF pixel location 312, and a static defect pixel location 314. An outline 316 illustrating the neighboring pixel locations from which the selected neighboring pixel locations may be selected is shown in FIG. 2. In an example, pixel intensity values representing pixel locations which lie within the outline 316 and are not identified by the pixel location data may be used to generate an improved pixel intensity value, for example pixel intensity values representing pixel locations 310, 312, and 314 may not be used. In other examples, selected neighboring pixel locations may include pixel locations identified by the pixel location data. Where an improved pixel intensity value is generated based on a plurality of pixel intensity values representing neighboring pixel locations, the inclusion of one or more compromised pixel intensity values, along with non-compromised pixel intensity values, may still lead to a pixel intensity value which is more accurate than the original compromised pixel intensity value. Including compromised pixel intensity values may also reduce the complexity of generating an improved pixel intensity value, where disregarding identified pixel locations may be difficult, or computationally expensive. The number of neighboring pixel locations which are selected may be greater than that shown in FIGS. 3A to 3C. The number of neighboring pixel locations which are considered may be dependent on the proportion of pixel locations which are static defect pixel locations and/or phase detection auto focus pixel locations. In other examples, the number of neighboring pixel locations which are selected may be dependent on the density of pixel locations representing the at least a portion of an image. For example, in an image sensor having many sensor pixels, it may be possible to consider a large number of neighboring pixels as they may represent a small portion of the image, whereas if there are fewer sensor pixels then considering the same number of neighboring pixels may mean considering a larger portion of an image which would decrease the accuracy. In other examples, the number of neighboring pixel locations which are selected may be dependent on the computational resources of a device performing the method.

In some examples, the selected neighboring pixel locations are determined by selecting a linear arrangement of neighboring pixel locations. FIG. 3B shows a schematic diagram of a sub-arrangement of pixel locations comprising a PDAF pixel location 320 for which an improved pixel intensity value is to be generated. The sub-arrangement also comprises a further PDAF pixel location 322 and shows an outline 324 illustrating neighboring pixel locations from which the selected neighboring pixel locations are chosen. In the example shown in FIG. 3B a linear arrangement of neighboring pixel locations is used. As PDAF pixel locations may be found in pairs, selecting a linear arrangement may prevent pixel intensity values representing other PDAF pixel locations from being considered. Even when generating improved pixel intensity values for static defect pixel locations, a liner arrangement may reduce the likelihood of including compromised pixel intensity values when generating the improved pixel intensity value. However, as discussed in relation to FIG. 3A, generating an improved pixel intensity value may include interpolating from pixel intensity values representing neighboring pixel locations which are identified by the pixel location data, i.e. PDAF and/or static defect pixel locations. FIG. 3B shows a vertically linear arrangement of neighboring pixel locations. FIG. 3C shows a schematic diagram of a sub-arrangement of pixel locations comprising a PDAF pixel location 330 for which an improved pixel intensity value is to be generated. The sub-arrangement also comprises a further PDAF pixel location 332 and an outline 334 illustrating of neighboring pixel locations from which the selected neighboring pixel locations are chosen. The selected neighboring pixel locations in this example being arranged in a linear arrangement, the linear arrangement being horizontal. It will be appreciated that although examples discussed in relation to FIGS. 3A to 3C relate to generating improved pixel intensity values at PDAF pixel locations, these examples will also apply to generating improved pixel intensity values at static defect pixel locations. The outlines 316, 324, and 334 shown in FIGS. 3A to 3C are of a defined size. However, it will be appreciated that more or fewer neighboring pixel locations may be considered when selecting neighboring pixel locations.

Storing Improved Image Data

Following the generation of interpolated image data comprising improved pixel intensity values representing pixel locations identified by the pixel location data, there may be two pixel intensity values representing the identified pixel locations. In some examples, storing improved image data comprises storing improved pixel intensity values of the interpolated image data representing pixel locations identified by the pixel location data and storing pixel intensity values of the input image data representing pixel locations not identified by the pixel location data. The resulting image data will have a pixel intensity value representing each pixel location. By storing improved image data comprising improved pixel intensity values at predetermined static defect pixel locations and/or phase detection autofocus pixel locations before detecting compromised pixel intensity values which arise from dynamic defects, the detection of dynamic defects may be more accurate. This may also increase the accuracy of detection of static defects which are not identified by the pixel location data. In some examples, detecting whether a pixel location is represented by a compromised pixel intensity value generated due to a dynamic defect comprises analysing pixel intensity values, or analysing metrics calculated from these values, and comparing them with the pixel intensity value representing the pixel location. If the image data used is of poor quality, then a threshold for detection may be set low in order to ensure defects are detected. However, this will likely lead to an increase in false identification of defects. By improving the quality of the image data used for defect detection it may be possible to use higher thresholds and therefore to reduce false identification of defects. Detection of further compromised pixel intensity values will be discussed further below.

Detecting Further Compromised Pixel Intensity Values

Figure 4:
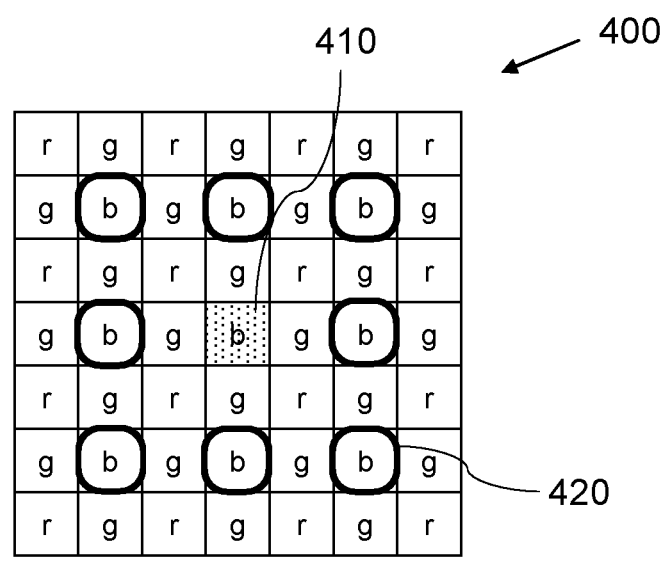
FIG. 4 shows a schematic diagram of an arrangement of pixel locations comprising a set of neighboring pixel locations.

As briefly mentioned above, the improved image data may be used to detect further compromised pixel intensity values, for example compromised pixel intensity values representing dynamic defect pixel locations or unidentified static defect pixel locations. In some examples, detecting one or more further compromised pixel intensity values based on the improved image data comprises determining for a first pixel location represented by a first pixel intensity value of the improved image data whether the first pixel intensity value is a compromised pixel intensity value based at least on the first pixel intensity value and one or more pixel intensity values of the improved image data representing a first set of neighboring pixel locations. FIG. 4 shows a schematic diagram of an arrangement of pixel locations 400 comprising a first pixel location 410 for which it is to be determined whether a first pixel intensity value of the improved image data representing the first pixel location 410 is a compromised pixel intensity value. A first set of neighboring pixel locations are highlighted such as pixel location 420. In some examples, the first set of neighboring pixel locations belong to the same colour channel as the first pixel location 410. However, in other examples, pixel locations corresponding to different colour channels may also be used.

In an example, determining whether the first pixel location is represented by a compromised pixel location based on the first pixel intensity value and pixel intensity values representing neighboring pixel locations comprises determining a ratio between a pixel error and dispersion in the pixel location neighbourhood and comparing this to a threshold. A general expression of this is shown below:

$$\Lambda = \left( \frac{|\overline{x_{m,n}} - x_{m,n}|}{D_{W \times H}} \leq T \right) \quad (1)$$

where $\overline{X_{m,n}}$ is an estimated pixel intensity value at a pixel location with coordinates (m,n), for example the first pixel location, generated based on pixel intensity values representing the set of neighboring pixel locations, $x_{m,n}$ is the pixel intensity value of the pixel location with coordinates (m,n). The pixel error may be calculated as the absolute difference between the estimated pixel intensity value and the actual pixel intensity value. $D_{W \times H}$ is the pixel dispersion value calculated over a pixel location patch W×H, centred on the pixel location (m,n). For example, the dispersion may be calculated based on a sum of absolute differences calculation. T is the threshold against which the ratio of pixel error and dispersion is compared to determine whether the pixel intensity value $x_{m,n}$ is a compromised pixel intensity value. $\Lambda$ is an indication of whether the pixel intensity value $x_{m,n}$ is a compromised pixel intensity value or not. As discussed previously, due to the use of improved image data in the detection of further compromised pixel intensity values, the sensitivity and reliability of the detection of compromised pixel intensity values may be increased. Therefore, it may be possible to use a more selective threshold and thereby reduce the number of false detections of compromised pixel intensity values. In some examples, the detection may be isotropic or directional. For example, the detection may consider pixel locations surrounding the pixel location 410. In other examples, the detection may perform a detection calculation directionally, by considering pixel locations which lie on a straight line crossing through pixel location 410, for example vertical, horizontal, diagonal at 45° and diagonal at 135°. In some examples, the detection may comprise detecting in more than one direction and isotropically and ranking and/or comparing the results to determine whether the pixel location 410 is represented by a compromised pixel intensity value.

This process may be repeated for each pixel location represented by a pixel intensity value of the improved image data. In some examples, the pixel location data may be used to identify static defect pixel locations and PDAF pixel locations and as such these pixel locations may not undergo further detections as they have already been identified as compromised pixel locations by the pixel location data.

In some examples, the method may further comprise generating a first corrected pixel intensity value representing the first pixel location and storing corrected image data comprising at least the first corrected pixel intensity value representing the first pixel location. Generating a first corrected pixel intensity value may be performed on the basis of pixel intensity values representing neighboring pixel locations and the pixel intensity value representing the first pixel location. For example, a first corrected pixel intensity value may be generated by blending the first pixel intensity value with an estimated pixel intensity value calculated from neighboring pixel intensity values. However, a corrected value may not necessarily be generated where the first pixel intensity value is not a further compromised pixel intensity value. A corrected pixel intensity value may also be generated for pixel locations which are identified by the pixel location data but do not undergo detection based on the processes described above.

In some examples, generating a first corrected pixel intensity value comprises, if the first pixel intensity value of the improved image data representing the first pixel location is a compromised pixel intensity value, generating a first corrected pixel intensity value based on pixel intensity values of the improved image data representing a second set of neighboring pixel locations and the first pixel intensity value. Generating a first corrected pixel intensity value may comprise, if the first pixel intensity value of the improved image data representing the first pixel location is not a compromised pixel intensity value, selecting the first pixel intensity value of the improved image data representing the first pixel location. Thereby, as the detection and correction of compromised pixel intensity values is performed for the first and subsequent pixel intensity values, corrected image data may be stored representing each pixel location, resulting in fully corrected image data. In some examples, the first set of neighboring pixel locations and the second set of neighboring pixel locations may comprise the same pixel locations, such that detection and correction of compromised pixel intensity values utilises the same set of pixel intensity values.

In some examples, subsequent detection of compromised pixel intensity values following the correction of the first pixel intensity value representing the first pixel location may use the corrected image data. This may further increase the accuracy of detection and correction of compromised pixel intensity values as at least a portion of the pixel intensity values representing neighboring pixel locations will be corrected image data.

In some examples, detecting one or more further compromised pixel intensity values based on the improved image data comprises determining for a second pixel location represented by a second pixel intensity value of the corrected image data whether the second pixel intensity value is a compromised pixel intensity value based at least on the second pixel intensity value and one or more pixel intensity values of the corrected image data representing a third set of neighboring pixel locations. For example, the second pixel location may be adjacent to the first pixel location and the third set of neighboring pixel locations may be the same shape and size as the first set of neighboring pixel locations but centred over the second pixel location. The second set of neighboring pixel locations may comprise the first pixel location, such that the pixel intensity values representing the second set of neighboring pixel locations may comprise at least one corrected pixel intensity value.

In some examples, the method further comprises generating a second corrected pixel intensity value representing the second pixel location and updating the corrected image data based on the second corrected pixel intensity value. By updating the corrected image data with further corrected pixel intensity values the detection and correction of pixel intensity values representing subsequent pixel locations may be increased as the detection and correction processes may use a greater number of corrected pixel intensity values. For example, where the process is repeated along each row from top to bottom of the image for a majority of the pixel locations, depending on the size and shape of the sets of neighboring pixel locations which are considered, detection and correction of further compromised pixel intensity values will be performed using some neighboring pixel locations represented by fully corrected image data and some neighboring pixel locations represented by improved image data, the improved image data comprising at least the interpolated image data generated by correcting based on predetermined PDAF pixel locations and static defect pixel locations.

Figure 5:
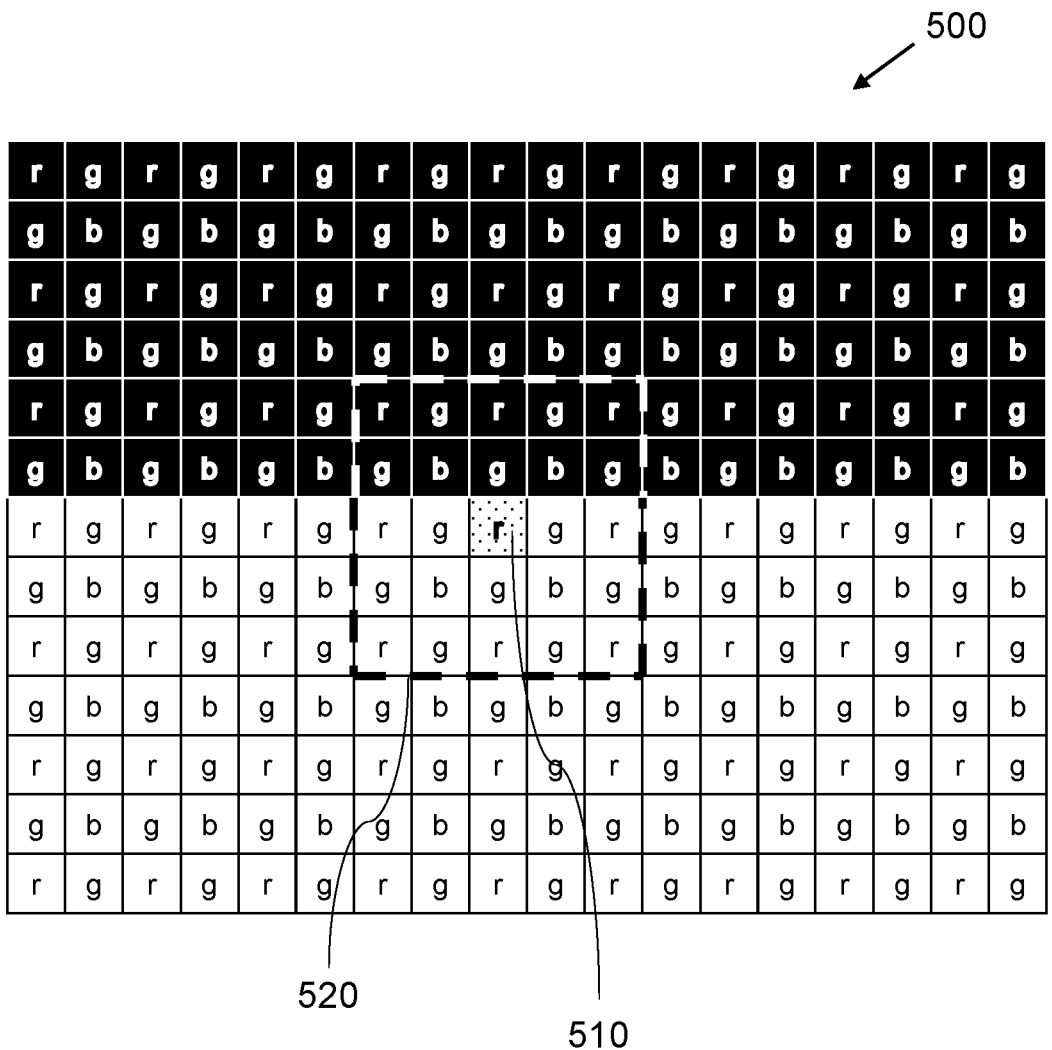
FIG. 5 shows a schematic diagram of an arrangement of pixel locations represented by corrected image data during a detection process.

FIG. 5 shows schematically an arrangement of pixel locations 500 represented by corrected input image data comprising improved pixel intensity values and corrected pixel intensity values. The pixel locations shown in black with white letters indicate pixel locations which are represented by a corrected pixel intensity value. Pixel locations shown in white with black writing indicate pixel locations which are represented by an improved pixel intensity value. Pixel location 510 represents a pixel location for which it is to be determined whether the improved pixel intensity value representing the pixel location 510 is a compromised pixel intensity value. For example, the pixel location 510 may be the second pixel location as discussed above. FIG. 5 also shows an outline 520, illustrated in broken lines, encircling a set of neighboring pixel locations from which the determining of whether the pixel location 510 is a compromised pixel location may be based. As can be seen in FIG. 5, the set of neighboring pixel locations may include some pixel locations which are represented by corrected pixel intensity values and some pixel locations which are represented by improved pixel intensity values. Using corrected image data for detecting and/or correcting further compromised pixel intensity values may further increase the accuracy of detection and/or correction.

In some examples, generating a second corrected pixel intensity value comprises, if the second pixel intensity value of the corrected image data representing the second pixel location is a compromised pixel intensity value, generating a second corrected pixel intensity value based on pixel intensity values of the corrected image data representing a fourth set of neighboring pixel locations and the second pixel intensity value. As discussed above, this may comprise blending the second pixel intensity value with an estimated pixel intensity value generated from pixel intensity values representing the fourth set of neighboring pixel locations. The pixel intensity values representing the fourth set of neighboring pixels may comprise one or more corrected pixel intensity values and one or more improved pixel intensity values. Detecting and/or correcting pixel intensity values based on corrected image data may increase the robustness of the detection and/or correction where there are clusters of compromised pixel intensity values. Partially correcting image data before using the image data to detect compromised pixel intensity values may increase the accuracy of detection. The same may apply to correction of compromised pixel intensity values.

In some examples generating a second corrected pixel intensity value may depend on details in the image which may be accounted for during correction. For example, the method may comprise detecting one or more edges in the image represented by the corrected image data and modifying the generation of the second corrected pixel intensity value in dependence on the detected one or more edges. Similarly, when generating the first corrected pixel intensity value, the method may comprise detecting one or more edges in the image represented by the improved image data and modifying the generation of the first corrected pixel intensity value in dependence on the detected one or more edges. In some examples, a corner, rather than an edge, may be detected and accounted for when generating corrected pixel intensity values. In some examples the third set of neighboring pixel locations and the fourth set of neighboring pixel locations may comprise the same neighboring pixel locations.

Figure 6:
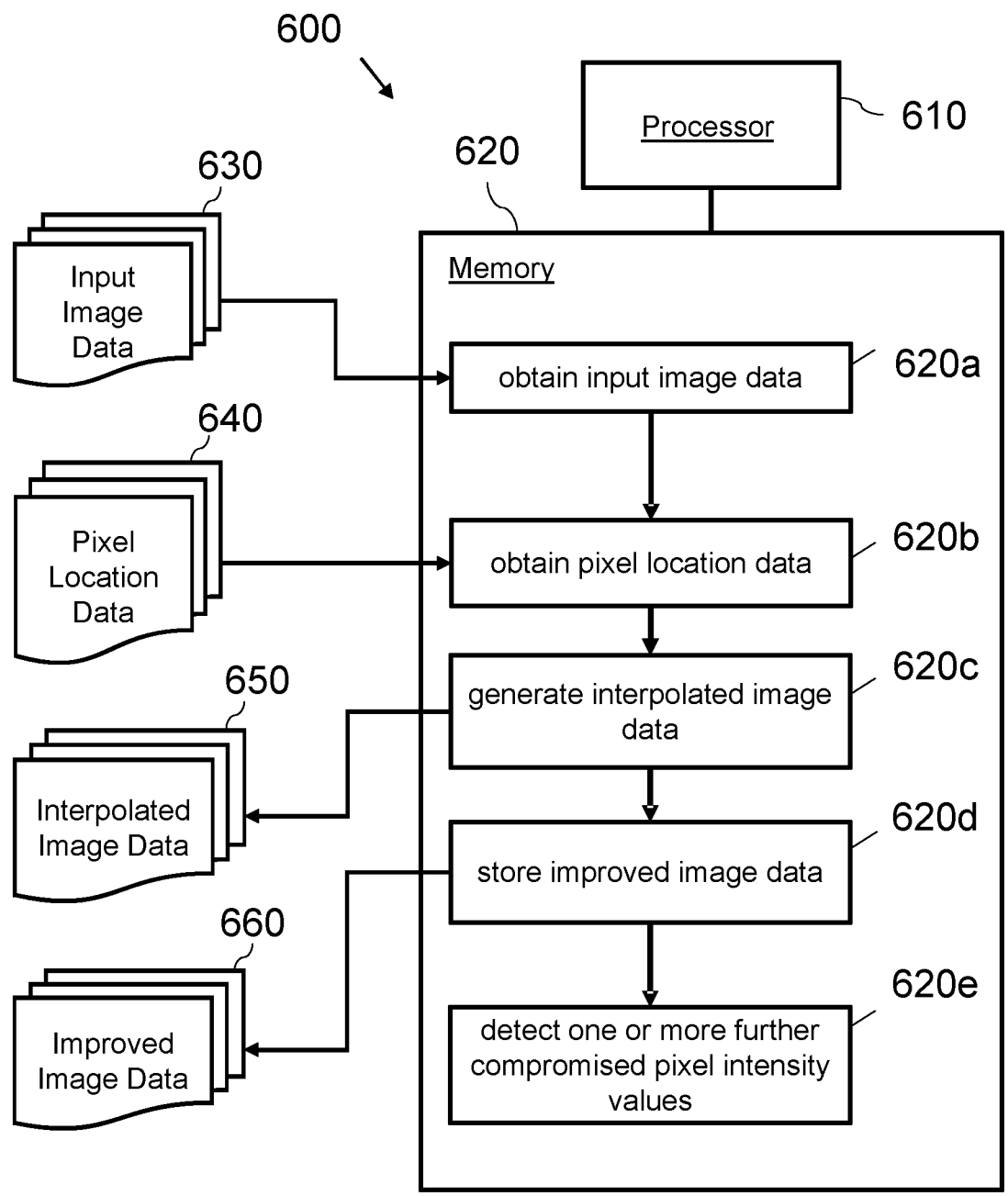
FIG. 6 shows a schematic diagram of an apparatus according to an example.

FIG. 6 is a schematic diagram illustrating an apparatus 600 according to an example. The apparatus 600 may be an image processing device or an image processing system. In some examples the apparatus may comprise an image signal processor for processing image data to generate further image data. In some examples, such as in the schematic diagram of FIG. 6, the apparatus 600 may comprise at least one processor 610. The at least one processor may be a single processor with a single core, a single processor with multiple cores, or a plurality of processors with any number of cores split across the plurality of processors. In some examples, the at least one processor may be a specific image signal processor configured to process image data, in other examples the at least one processor may be a central or graphical processing unit (CPU or GPU), or custom processing unit designed for the purposes described herein, configured to perform the function described herein, for example process image data. The apparatus 600 may comprise at least one memory 620 including computer program code. The computer program code may be in any suitable format or program language. The program code may be written in high or low level computer program language. The at least one memory 620 and the computer program code may be configured to, with the at least one processor 610, cause the apparatus 600 at least to obtain input image data 630 representative of at least a portion of an image, as shown at block 620a, the input image data 630 comprising a plurality of pixel intensity values representing a respective plurality of pixel locations. In some examples, the input image data 630 may be stored on the at least one memory 620. In other examples, the input image data 630 may be transmitted to be received by the apparatus 600 by any suitable wired or wireless electronic communication means. For example, the input image data 630 may be transmitted by a remote image capture device, such as a smart telephone or camera, to the apparatus 600. In other examples, the input image data 630 may captured by a local image sensor, for example where the apparatus 600 is comprised in an image capture device such as a smart telephone or a camera. The at least one memory 620 and the computer program code may be configured to, with the at least one processor 610, obtain pixel location data 640 identifying one or more pixel locations represented by one or more respective compromised pixel intensity values, as shown at block 620b. As discussed above, the pixel location data 640 may be generated based on static defect pixel locations which may be stored on memory at an image sensor. The pixel location data 640 may be generated based on phase detection autofocus pixel locations, which may be predetermined, dependent on an image sensor used to generate the input image data and may be stored with the image sensor or remotely from the image sensor. In some examples, obtaining the input image data may comprise generating input image data from predetermined static defect pixel locations and predetermined phase detection autofocus pixel locations. The at least one memory 620 and the computer program code may be configured to, with the at least one processor 610, cause the apparatus 600 to: generate interpolated image data 650 comprising one or more improved pixel intensity values representing the one or more identified pixel locations based on the input image 630 data and the pixel location data 640, as shown at block 620c; store improved image data 660 comprising at least the interpolated image data 650, as shown at block 620d. The at least one memory 620 and the computer program code may also be configured to, with the at least one processor 610, cause the apparatus 600 to detect one or more further compromised pixel intensity values based on the improved image data 660, as shown at block 620e.

The apparatus 600 may also be configured to perform other processes described herein. The apparatus 600 may for example be configured to determine whether a first pixel location is represented by a first pixel intensity value of the improved image data which is a compromised pixel intensity value, to generate a first corrected pixel intensity value, to store corrected image date comprising at least the first corrected pixel intensity value, to subsequently determine whether a second pixel location is represented by a second pixel intensity value of the corrected image data, to generate a second corrected pixel intensity value, and to update the corrected image data based on the second corrected pixel intensity value. The apparatus 600 may perform a subset of the above processes or all of these processes. In some examples, the apparatus 600 may comprise fixed-function hardware. For example, the apparatus 600 may be an application specific integrated circuit. The application specific integrated circuit may comprise any number of processors, microprocessors, and/or memory blocks, including, for example, RAM, ROM, EEPROM, or flash memory. In other examples, the apparatus 600 may be a non-specific computing device such as, for example, a desktop computer, configured to perform the method as described above. For example, the at least one memory 620 may comprise, any number of volatile or non-volatile memories such as, a hard drive, a CD-ROM disc, a USB-drive, a solid-state drive, RAM, ROM, or any other form of magnetic storage device, optical storage device, or flash memory device, maintained locally or accessed remotely, capable of having stored thereon computer readable code suitable for the function described herein.

Figure 7:
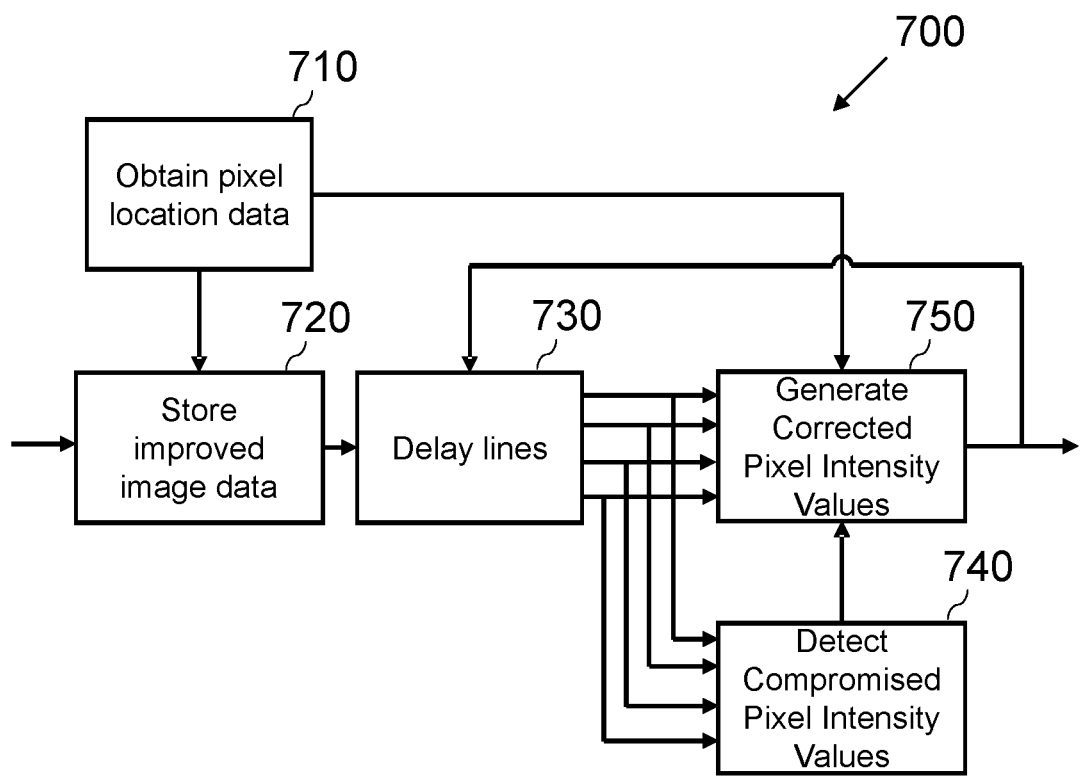
FIG. 7 shows a schematic diagram of a work flow according to an example.

FIG. 7 shows a schematic diagram of a work flow 700 for processing image data according to examples. At block 710, pixel location data may be obtained, for example a mask may be generated based on predetermined phase detection autofocus pixel locations and/or static defect pixel locations. At block 720, interpolated image data may be generated and improved image data, comprising at least the interpolated image data, may be stored. At block 730, the improved image data is split into rows of pixel intensity values. Processing image data relating to all pixel locations at one time may be very computationally expensive. Consequently, the improved image data may be split into rows of pixel intensity values and processed sequentially. Upon splitting the improved image data into rows, several rows of data may be used simultaneously, at block 740, to detect compromised pixel intensity values. Detection of compromised pixel intensity values may be performed at each pixel location along a row before dropping down to the next sequential row and performing detection of compromised pixel intensity values at each pixel location along this sequential row. Provided that the number and arrangement of neighboring pixel locations which are used to detect compromised pixel intensity values is the same for each sequential row, as the process moves to the next sequential row, the memory may stop storing the top row of pixel intensity values and may load a further bottom row of pixel intensity values. Thereby, maintaining consistent memory usage while moving through the improved image data and detecting compromised pixel intensity values. In other examples, the updating of pixel intensity values which are used at block 740 may occur on a per pixel basis.

The results from the detecting, at block 740, may be passed to block 750 where corrected pixel intensity values are generated. This block 750 may also process the improved image data of a selected number of rows of pixel intensity values at a time. Block 750 may also have as an input the pixel location data such that even if static defect pixel locations and/or PDAF pixel locations have been partially corrected when in the improved image data they may be identified and corrected further. The output, from block 750, of corrected pixel intensity values may form an input to the delay line at block 730 such that the image data which is used to detect the compromised pixel intensity values at block 740 and used to correct the detected compromised pixel intensity values at block 750 comprises corrected pixel intensity values from previously detected and corrected compromised pixel intensity values. In some examples, the corrected image data is updated following the correction of compromised pixel intensity values for an entire row. In other examples, the corrected image data is updated following the correction of each compromised pixel intensity value.

Figure 8:
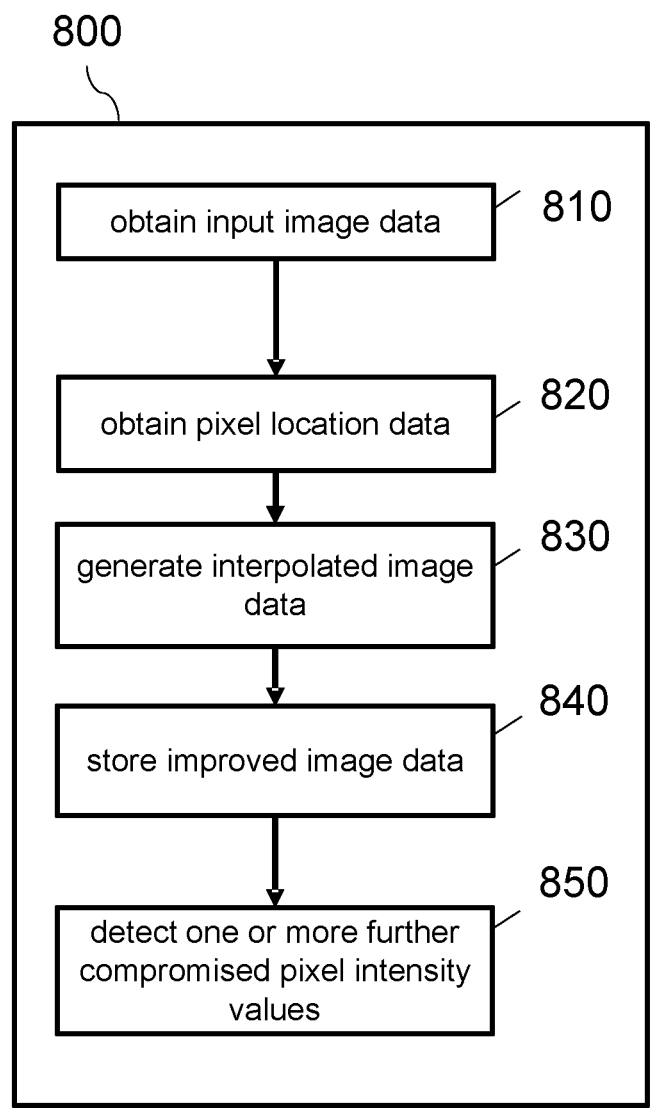
FIG. 8 shows a schematic diagram of a non-transitory computer-readable storage medium according to an example.

FIG. 8 shows a schematic diagram of a non-transitory computer-readable storage medium 800 comprising executable instructions. The executable instructions, when executed by a processor, may cause operation of an image processing system at least to: obtain input image data 810 representative of at least a portion of an image, the input image data comprising a plurality of pixel intensity values representing a respective plurality of pixel locations; obtain pixel location data 820 identifying one or more pixel locations represented by one or more respective compromised pixel intensity values; generate interpolated image data 830 comprising one or more improved pixel intensity values representing the one or more identified pixel locations based on the input image data; store improved image data 840 comprising at least the interpolated image data; and detect one or more further compromised pixel intensity values 850 based on the improved image data.

The above embodiments are to be understood as illustrative examples of the invention, further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method comprising:
   obtaining input image data representative of at least a portion of an image, the input image data comprising a plurality of pixel intensity values representing a respective plurality of pixel locations;

obtaining pixel location data identifying a first set of one or more pixel locations represented by one or more respective compromised pixel intensity values;

generating interpolated image data comprising one or more improved pixel intensity values representing the one or more identified pixel locations based on the input image data and the pixel location data, wherein the one or more improved pixel intensity values are generated at least by interpolation of pixel intensity values representing selected neighboring pixel locations;

storing improved image data comprising at least the interpolated image data; and detecting a second set of one or more further pixel locations represented by one or more respective compromised pixel intensity values based on the improved image data including the one or more improved pixel intensity values, wherein the second set of one or more further pixel locations are different to the first set of one or more pixel locations.

2. The computer-implemented method of claim 1, wherein the pixel location data identifies one or more static defect pixel locations.

3. The computer-implemented method of claim 1, wherein the pixel location data identifies one or more phase detection autofocus pixel locations.

4. The computer-implemented method of claim 1, wherein the pixel location data identifies one or more static defect pixel locations and one or more phase detection autofocus pixel locations.

5. The computer-implemented method of claim 4, wherein obtaining the pixel location data comprises generating the pixel location data based on predetermined phase detection autofocus pixel locations and predetermined static defect pixel locations.

6. The computer-implemented method of claim 1, wherein the selected neighboring pixel locations do not include pixel locations identified by the pixel location data.

7. The computer-implemented method of claim 6, wherein the selected neighboring pixel locations are determined by selecting a linear arrangement of neighboring pixel locations.

8. The computer-implemented method of claim 1, wherein the selected neighboring pixel locations are determined by selecting a linear arrangement of neighboring pixel locations.

9. The computer-implemented method of claim 1, wherein storing improved image data comprises:

storing improved pixel intensity values of the interpolated image data representing pixel locations identified by the pixel location data; and storing pixel intensity values of the input image data representing pixel locations not identified by the pixel location data.

10. The computer-implemented method of claim 1, wherein detecting the second set of one or more further pixel locations represented by one or more respective compromised pixel intensity values based on the improved image data comprises determining for a first pixel location represented by a first pixel intensity value of the improved image data whether the first pixel intensity value is a compromised pixel intensity value based at least on the first pixel intensity value and one or more pixel intensity values of the improved image data representing a first set of neighboring pixel locations.

11. The computer-implemented method of claim 10, further comprising:

generating a first corrected pixel intensity value representing the first pixel location; and storing corrected image data comprising at least the first corrected pixel intensity value representing the first pixel location.

12. The computer-implemented method of claim 11, wherein generating a first corrected pixel intensity value comprises:

if the first pixel intensity value of the improved image data representing the first pixel location is a compromised pixel intensity value, generating the first corrected pixel intensity value based on pixel intensity values of the improved image data representing a second set of neighboring pixel locations and the first pixel intensity value; or if the first pixel intensity value of the improved image data representing the first pixel location is not a compromised pixel intensity value, selecting the first pixel intensity value of the improved image data representing the first pixel location.

13. The computer-implemented method of claim 12, wherein the first set of neighboring pixel locations and the second set of neighboring pixel locations comprise the same pixel locations.

14. The computer-implemented method of claim 11, wherein detecting the second set of one or more further pixel locations represented by one or more respective compromised pixel intensity values based on the improved image data comprises determining for a second pixel location represented by a second pixel intensity value of the corrected image data whether the second pixel intensity value is a compromised pixel intensity value based at least on the second pixel intensity value and one or more pixel intensity values of the corrected image data representing a third set of neighboring pixel locations.

15. The computer-implemented method of claim 14, further comprising:

generating a second corrected pixel intensity value representing the second pixel location; and updating the corrected image data based on the second corrected pixel intensity value representing the second pixel location.

16. The computer-implemented method of claim 15, wherein generating a second corrected pixel intensity value comprises:

if the second pixel intensity value of the corrected image data representing the second pixel location is a compromised pixel intensity value, generating the second corrected pixel intensity value based on pixel intensity values of the corrected image data representing a fourth set of neighboring pixel locations and the second pixel intensity value; or if the second pixel intensity value of the corrected image data representing the second pixel location is not a compromised pixel intensity value, selecting the second pixel intensity value of the corrected image data representing the second pixel location.

17. The computer-implemented method of claim 16, wherein the third set of neighboring pixel locations and the fourth set of neighboring pixel locations comprise the same neighboring pixel locations.

18. An apparatus comprising:

at least one processor;

at least one memory including computer program code, the at least one memory and the computer program code configured to, with the at least one processor, cause the apparatus at least to:

obtain input image data representative of at least a portion of an image, the input image data comprising a plurality of pixel intensity values representing a respective plurality of pixel locations;

obtain pixel location data identifying a first set of one or more pixel locations represented by one or more respective compromised pixel intensity values;

generate interpolated image data comprising one or more improved pixel intensity values representing the one or more identified pixel locations based on the input image data and the pixel location data, wherein the one or more improved pixel intensity values are generated at least by interpolation of pixel intensity values representing selected neighboring pixel locations;

store improved image data comprising at least the interpolated image data; and detect a second set of one or more further pixel locations represented by one or more respective compromised pixel intensity values based on the improved image data including the one or more improved pixel intensity values, wherein the second set of one or more further pixel locations are different to the first set of one or more pixel locations.

19. A non-transitory computer-readable storage medium comprising computer-executable instructions which when executed by a processor cause operation of an image processing system at least to:

obtain input image data representative of at least a portion of an image, the input image data comprising a plurality of pixel intensity values representing a respective plurality of pixel locations;

obtain pixel location data identifying a first set of one or more pixel locations represented by one or more respective compromised pixel intensity values;

generate interpolated image data comprising one or more improved pixel intensity values representing the one or more identified pixel locations based on the input image data and the pixel location data, wherein the one or more improved pixel intensity values are generated at least by interpolation of pixel intensity values representing selected neighboring pixel locations;

store improved image data comprising at least the interpolated image data; and detect a second of one or more further pixel locations represented by one or more respective compromised pixel intensity values based on the improved image data including the one or more improved pixel intensity values, wherein the second set of one or more further pixel locations are different to the first set of one or more pixel locations.

* * * * *